US009738279B2

(12) United States Patent
Eichhorn et al.

(10) Patent No.: US 9,738,279 B2
(45) Date of Patent: Aug. 22, 2017

(54) METHOD FOR DETERMINING A LANE COURSE OF A LANE

(71) Applicant: Bayerische Motoren Werke Aktiengesellschaft, Munich (DE)

(72) Inventors: Andreas von Eichhorn, Munich (DE); Peter Zahn, Herrsching A. Ammersee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/919,579

(22) Filed: Oct. 21, 2015

(65) Prior Publication Data
US 2016/0039413 A1    Feb. 11, 2016

Related U.S. Application Data

(63) Continuation of application No. PCT/EP2014/058320, filed on Apr. 24, 2014.

(30) Foreign Application Priority Data

Apr. 26, 2013 (DE) .................. 10 2013 207 658

(51) Int. Cl.
*G01C 22/00* (2006.01)
*G05D 1/00* (2006.01)
(Continued)

(52) U.S. Cl.
CPC ...... *B60W 30/0956* (2013.01); *B60W 30/095* (2013.01); *B60W 30/12* (2013.01);
(Continued)

(58) Field of Classification Search
CPC ..... B60W 30/18163; B60W 2710/207; B60W 2710/18; B60W 2420/403;
(Continued)

(56) References Cited

U.S. PATENT DOCUMENTS 4,999,789 A * 3/1991 Fiasconaro ............ G06T 17/00
345/427
6,047,234 A * 4/2000 Cherveny .............. G01C 21/26
340/988
(Continued)

FOREIGN PATENT DOCUMENTS

DE    10 2005 002 719 A1    8/2006
DE    10 2005 029 444 A1    12/2006
(Continued)

OTHER PUBLICATIONS

PCT/EP/2014/058320, International Search Report dated Jul. 22, 2014 (Three (3) pages).
(Continued)

*Primary Examiner* — Jelani Smith
*Assistant Examiner* — Luis A Martinez Borrero
(74) *Attorney, Agent, or Firm* — Crowell & Moring LLP

(57) ABSTRACT

The invention relates to determining a lane course with the aid of a plurality of recorded routes of vehicles using a compensation curve. Each of the plurality of recorded routes includes individual position indications in an order of passing during a respective journey. The method includes selecting a route from the plurality of recorded routes, determining a number of checkpoints for the compensation curve based on the selected route, and determining an initial compensation curve based on the number of checkpoints and the selected route from the plurality of routes. The method further includes performing, in a repeating fashion until an abort criterion has been satisfied, determining a new compensation curve using a previously-determined compensation curve and individual position indications of the plurality of routes, wherein determining the new compensation curve is performed independently of an order of position indications in one of the respective routes and being independent of the fact that a position indication used is assigned to a
(Continued)

route from the plurality of routes, and outputting the new compensation curve as the lane course.

12 Claims, 5 Drawing Sheets

(51) Int. Cl.
| | |
|---|---|
| *B60W 30/095* | (2012.01) |
| *B60W 40/06* | (2012.01) |
| *G01C 21/32* | (2006.01) |
| *B60W 50/14* | (2012.01) |
| *B60W 40/072* | (2012.01) |
| *B60W 30/12* | (2006.01) |
| *G01C 21/34* | (2006.01) |
| *B60W 50/00* | (2006.01) |

(52) U.S. Cl.
CPC .......... *B60W 40/06* (2013.01); *B60W 40/072* (2013.01); *B60W 50/14* (2013.01); *G01C 21/32* (2013.01); *G01C 21/3407* (2013.01); *B60W 2050/0089* (2013.01); *B60W 2550/406* (2013.01)

(58) Field of Classification Search
CPC . B60W 2510/0638; B60W 2510/0657; B60W 2550/14; B60W 2550/148; B60W 30/0956; G01C 21/3469; G01C 21/3617; G01C 21/3679; G01C 21/3685; G01C 21/3461; G01C 21/3484; G01C 21/3605; G01C 21/3676; G01C 21/3629; G01C 21/3438; G01C 21/3608; G01C 21/3664; G06F 17/3028; G06F 17/30554; G06F 17/30979
USPC ..... 701/26, 1, 22, 301, 117, 118, 25, 36, 70, 701/410, 42, 465, 487
See application file for complete search history.

(56) References Cited

U.S. PATENT DOCUMENTS

| | | | | |
|---|---|---|---|---|
| 6,850,841 | B1 * | 2/2005 | Casino | G01C 21/26 340/995.1 |
| 7,194,356 | B2 * | 3/2007 | Sano | G01C 21/3461 701/428 |
| 7,626,533 | B2 * | 12/2009 | Cong | B60K 31/0008 342/113 |
| 8,271,190 | B2 * | 9/2012 | Smartt | G01C 21/32 701/409 |
| 8,346,473 | B2 * | 1/2013 | Nakamura | G01C 21/30 340/937 |
| 8,874,361 | B2 * | 10/2014 | Krumm | G01C 21/32 340/936 |
| 9,448,074 | B2 * | 9/2016 | Mizuno | G09B 29/106 |
| 9,483,872 | B2 * | 11/2016 | Meyer | G01C 21/26 |
| 2001/0027360 | A1 * | 10/2001 | Nakano | G05D 1/0261 701/23 |
| 2004/0158390 | A1 * | 8/2004 | Mukaiyama | G08G 1/161 701/400 |
| 2005/0033516 | A1 * | 2/2005 | Kawasaki | B60R 21/013 701/301 |
| 2008/0208460 | A1 * | 8/2008 | Nakao | G01C 21/3658 701/532 |
| 2008/0275602 | A1 * | 11/2008 | Peake | G05D 1/0212 701/25 |
| 2009/0138188 | A1 * | 5/2009 | Kores | G01C 21/32 701/117 |
| 2009/0299569 | A1 | 12/2009 | Knoll et al. | |
| 2010/0121569 | A1 * | 5/2010 | Nakamura | G01C 21/30 701/532 |
| 2010/0305850 | A1 * | 12/2010 | Krumm | G01C 21/32 701/532 |
| 2011/0264708 | A1 * | 10/2011 | Smartt | G01C 21/32 707/803 |
| 2012/0095682 | A1 * | 4/2012 | Wilson | G01C 21/32 701/532 |
| 2013/0030686 | A1 * | 1/2013 | Morotomi | G08G 1/167 701/301 |
| 2013/0054128 | A1 * | 2/2013 | Moshchuk | G08G 1/167 701/301 |
| 2013/0080019 | A1 * | 3/2013 | Isaji | B60W 30/16 701/96 |

FOREIGN PATENT DOCUMENTS

| | | |
|---|---|---|
| DE | 10 2006 040 334 A1 | 3/2008 |
| EP | 2 602 744 A1 | 6/2013 |
| WO | WO 2007/010317 A1 | 1/2007 |
| WO | WO 2011/122150 A1 | 10/2011 |

OTHER PUBLICATIONS

German Search Report issued in counterpart German Application No. 10 2013 207 658.4 with Statement of Relevancy (Seven (7) pages).
De Boor, "A Practical Guide to Splines", 1$^{st}$ ed. 1978, 2001, book.
Schindler et al., "Exploiting Arc Splines for Digital Maps", 14 International Conference on Intelligent Transportation Systems (ITSC), 2011, Five pages.
Wang et al., "Fitting B-Spline Curves to Point Clouds by Curvature-Based Squared Distance Minimization", ACM Transactions on Graphics, vol. 25, No. 2, Apr. 1, 2006 (Apr. 1, 2006), pp. 214-238, XP055128048.

* cited by examiner

METHOD FOR DETERMINING A LANE COURSE OF A LANE

CROSS REFERENCE TO RELATED APPLICATIONS

This application is a continuation of PCT International Application No. PCT/EP2014/058320, filed Apr. 24, 2014, which claims priority under 35 U.S.C. §119 from German Patent Application No. 10 2013 207 658.4, filed Apr. 26, 2013, the entire disclosures of which are herein expressly incorporated by reference.

BACKGROUND AND SUMMARY OF THE INVENTION

The invention relates to a method for determining a lane course of a lane with the aid of a multiplicity of recorded routes using a compensation curve, to a corresponding apparatus and to a corresponding computer program.

Some such driver assistance systems and, in particular, future driver assistance systems such as collision warning systems or advanced navigation systems require relatively accurate information relating to the geometry of road courses and, in particular, intersections and lane courses. The accuracy and up-to-dateness of this information is very important, in particular in safety-critical driver assistance systems.

The process of providing this information with the aid of a vehicle equipped with a precision positioning system, for example a particularly accurate GPS receiver, is very complicated in view of the large number of intersections.

Many of the modern vehicles have a simple GPS receiver. However, these GPS receivers provide only comparatively noisy measurements and do not provide sufficient accuracy to infer the exact course of a lane from the recordings of a route.

In the publication "Exploiting are splines for digital maps", 14th International Conference on Intelligent Transportation Systems (ITSC), 2011 by A. Schindler et al., so-called "arc splines" are used to represent lanes. However, sorted and accurate position determinations, which are not reliably provided by simple GPS receivers, are required for the method presented there.

In the field of image processing, the calculation of a "B-spline" curve in order to approximate a noisy point cloud is known and is described, for example, in the publication "Fitting b-spline curves to point clouds by squared distance minimization", ACM Transactions on graphics, 2004 by W. Wang et al.

An object of the invention is to determine a lane course on the basis of a multiplicity of noisy recorded routes for a road section.

In one aspect, a method for determining a lane course of a lane with the aid of a multiplicity of recorded routes using a compensation curve, each route of the multiplicity of routes comprising individual position indications of the vehicle in the order of passing during the respective journey, comprises the following: selecting a route from the multiplicity of routes; determining the number of checkpoints for the compensation curve on the basis of the selected route; determining an initial compensation curve on the basis of the number of checkpoints and the selected route from the multiplicity of routes; repeating the following step until an abort criterion has been satisfied: determining a new compensation curve using the previously determined compensation curve and individual position indications of the routes of the multiplicity of routes, the process of determining the new compensation curve being independent of the order of position indications in one of the respective routes and being independent of the fact that a position determination used is assigned to a route from the multiplicity of routes; outputting the compensation curve determined last as the lane course. The abort criterion may be a predefined number of repetitions, for example 3 or 4, or the specification of a minimum difference between the respectively calculated compensation curves. A course of a lane or of a journey of a vehicle describes the spatial arrangement, possibly only in two dimensions, of the lane or of the locations occupied by a vehicle.

The method makes it possible to use a multiplicity of routes with noisy position indications, the individual accuracy of which would be insufficient to create accurate lane courses, to automatically determine a more accurate course of a lane. For this purpose, a plurality of routes are considered together and the inaccuracies on account of the noise are therefore reduced. In this case, it does not matter whether the noise is caused by the position measurement or by varying driver behavior. In this manner, recordings from vehicles with simple GPS receivers can be used to generate more accurate lane courses than have been recorded by the simple GPS receivers. Various crossings by different drivers can likewise be used to determine a lane course representative of an average driver.

One advantage of determining lane courses with the aid of routes which have actually been traveled is that the actual routes may be more relevant to driver assistance systems than the course of lanes which has been determined on the basis of highly accurate measurements. This is because drivers do not always drive in the exact center of a lane, for example on bends. Driver assistance systems can then better determine possible collision points on the basis of the lane courses which have actually been traveled and can also better predict the driver's intention if this prediction is based on position evaluations with respect to lanes.

The method is suitable for determining the lane course both at intersections and for road sections without intersections. The course of bends, for example, may be of interest on these road sections. The course of the lane is typically considered in the plane; the lanes may also be determined in all three spatial dimensions at complex intersections with flyovers. The method is advantageous, in particular, when each road has only one lane in one direction and/or when only one lane is available for each possible maneuver (passing through, turning left/right). If a road comprises two or more parallel lanes for the same possible maneuver, the position indications of the vehicles will have accumulations in the center of each lane. These accumulations can be used to distinguish the routes running on parallel lanes.

The method is preferably carried out in a central stationary server which has previously received the multiplicity of routes of vehicles having simple GPS receivers. The individual position indications are consecutively numbered with the index k irrespective of the affiliation with routes and are referred to as $M_k$.

A B-spline curve P(t) is advantageously used as the compensation curve. This parameterization of the lane course provides the advantage that, in addition to the spatial course of the lane, it also describes a curvature course which is constant in sections and is advantageous for use in assistance systems. A B-spline curve is described by the following formula:

$$P(t) = \sum_{i=1}^{L} P_i B_i^p(t)$$

where $P_i$ are checkpoints and $B_i^p$ is the B-spline basic function $B_i$ of a particular order p which can be calculated using the recursion stated in "A Practical Guide to Splines", Applied Mathematical Sciences, Springer, 2001 by C. De Boor. In the present method, the order p is advantageously 3, with the result that a cubic B-spline curve is produced. The variable t indicates the distance on the B-spline curve from a zero point on the curve. The use of B-spline curves as compensation curves has the advantage that only a relatively small number of parameters is needed to describe the curve, in particular in comparison with approximation of the curve profile by stringing together straight-line sections. Therefore, this way of describing the compensation curve is particularly well-suited to wireless transmission and efficient use of transmission bandwidth.

In comparison with the existing data format of the $sim^{TD}$ D21.4 specification of the communication protocols, http://www.simtd.de, the description of the lanes does not end at the stop line of an intersection. With the aid of the continuous description of the lanes by means of B-splines, the prediction of routes in the unstructured inner region of intersections is improved, particularly in the case of complex inner-city intersections. The specifications made in the $sim^{TD}$ D21.4 specification of the communication protocols can be supplemented with the description of B-splines or similar descriptions which describe lanes without interruptions.

The position indications are typically determined with the aid of one or more satellite navigation systems. GPS, Galileo and/or GLONASS, in particular, are possible for this.

The method may also comprise the following steps which are carried out before all other steps: determining those routes from the multiplicity of routes which follow the same lane; reducing the multiplicity of routes to the determined routes, with the result that only these routes are included in the multiplicity of routes. The consideration of intersections and the lane courses there, in particular, is relevant to safety driver assistance systems. At the same time, the vehicles at intersections will choose different maneuvers, for example turning left or right or driving straight ahead. Determining a lane course on the basis of recorded routes only makes sense insofar as all routes considered represent journeys which have carried out the same maneuver. These journeys are therefore considered in isolation.

In one development, the process of determining those routes from the multiplicity of routes which follow the same lane comprises the following for each route: determining whether a position indication of the respective route is in a first predefined position region and a position indication of the same route is in a second predefined position region. At an intersection for example, a first predefined position region may be set to a region in or before the intersection in which vehicles enter the intersection, and a second predefined position region may be set to a region in or before the intersection through which vehicles travel when leaving the intersection. This makes it possible to separate the various possible ways of crossing the intersection (passing through, turning left/right).

In one development, the process of determining the number of checkpoints for the compensation curve comprises the following: dividing the length of the randomly selected route by a predefined divisor length; selecting the number of checkpoints on the basis of the division result. A B-spline compensation curve P requires checkpoints $P_i$ for parameterization. For this purpose, the number of checkpoints must first of all be determined. For this purpose, the present method proposes dividing the length of the randomly selected route by a divisor length $k_{igl}$. The divisor length $k_{igl}$ can be freely determined and tests of the practice have shown that a divisor length of $k_{igl}$=15 m provides good results. The divisor length $k_{igl}$ is advantageously in the range of 2 m to 35 m. The division result is advantageously also rounded to the next larger or smaller integer.

In one development, the process of determining the new compensation curve also comprises: for each position indication used: determining the point on the previously determined compensation curve which is at the shortest distance from the respective position indication; determining this point as the base point for the respective position indication. In the formula stated above for the definition of a B-spline, the base points may be indicated by the variable t. A $t_k$ is determined for each position indication $M_k$ used. The determination of the respective base points is used as the basis for optimizing the compensation curve, that is to say determining a new compensation curve on the basis of the preceding compensation curve.

In one advantageous development, the process of determining the new compensation curve comprises the multiplication of matrices, at least one matrix of which comprises the individual position indications used. The matrix having the individual position indications used may also be a vector. Vectors are also understood as meaning matrices herein. The multiplication of matrices is a computing operation which can be carried out in a very efficient and rapid manner on computers. One advantage of the presented method lies herein. The compensation curves are calculated in a computationally simple manner. The compensation curve can therefore be determined quickly and cost-effectively. This also simplifies continuous updating of the lane courses determined. Roadworks or similar short-term displacements of the lane courses may therefore be quickly detected and made available to driver assistance systems.

The lane courses obtained may be used for a driver assistance system as a basis for determining whether there is a threat of a collision between a vehicle and another road user; this detected risk can be displayed as a warning. One example of such a driver assistance system is an intersection assistant for avoiding collisions at intersections.

In another aspect, an apparatus comprises electronic computing and storage means, the apparatus being set up to carry out one of the methods presented above, the apparatus being set up such that the storage means store at least the individual position indications used and parameters of a compensation curve. The computing means may be included in a computer and may be a microprocessor, a microcontroller or dedicated circuits. The storage means may be memories from computer technology which are known from the prior art.

Furthermore, in another aspect, a computer program is designed to cause a computer to carry out one of the above methods during its execution.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference symbols relate to corresponding elements throughout the figures.

DETAILED DESCRIPTION OF THE DRAWINGS

Figure 1:
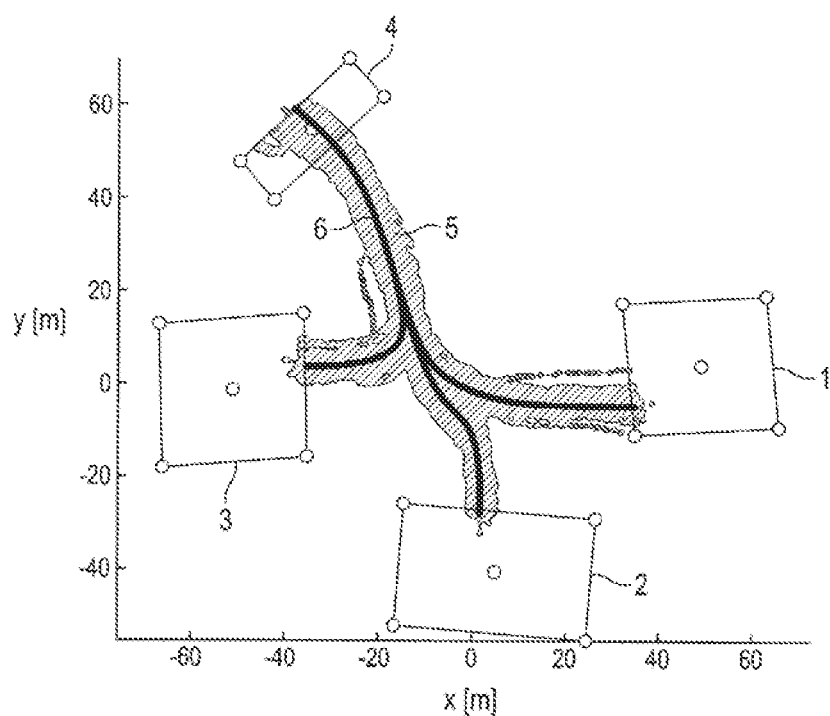
FIG. 1 schematically shows the procedure when selecting lane courses according to one exemplary embodiment.

FIG. 1 shows the routes 5 of vehicles at an intersection which have been recorded and have been transmitted to a central server in the backend. Only routes 5 of journeys which start on the northern access road of the intersection in the sense of FIG. 1 are illustrated and taken into account here. The actual lane courses are depicted, as orientation, with reference numeral 6. Each route consists of position indications arranged in the order of passing through. The position indications are illustrated as gray dots in FIG. 1. Position indications belonging to a route are connected by a thin line. For example, an individual route in the vicinity of the region 1 between approximately x=5 m to 40 m and y=1 m to 5 m is visible in FIG. 1. Most of the routes illustrated in FIG. 1 overlap such that only a gray area is visible.

In order to determine a lane course, the individual routes are first of all sorted after the driving maneuver has been carried out. For this purpose, regions 1 to 4 which are arranged on the access road to the intersection and at one of the exits of the intersection are determined. In order to determine the lane for turning right, all those routes which each comprise at least one position indication in the position region 4 and each comprise at least one position indication in the position region 3 are selected. The routes selected in this manner form the multiplicity of routes for which a lane course is determined. This lane course indicates the course of the lane for turning right.

The lane may likewise be determined for the routes each comprising at least one position indication in the position region 4 and each comprising at least one position indication in the position region 2. This then indicates the lane for passing through the intersection.

In order to determine the lane course for turning left, all those routes which comprise at least one position indication in the position region 4 and at least one position indication in the position region 1 are selected.

The position regions 1 to 4 may be automatically generated with the aid of already existing maps or can be created on the basis of existing maps by means of manual processing. The position regions 1 to 4 are relatively coarse indications of where lane courses may begin and end.

Figure 2:
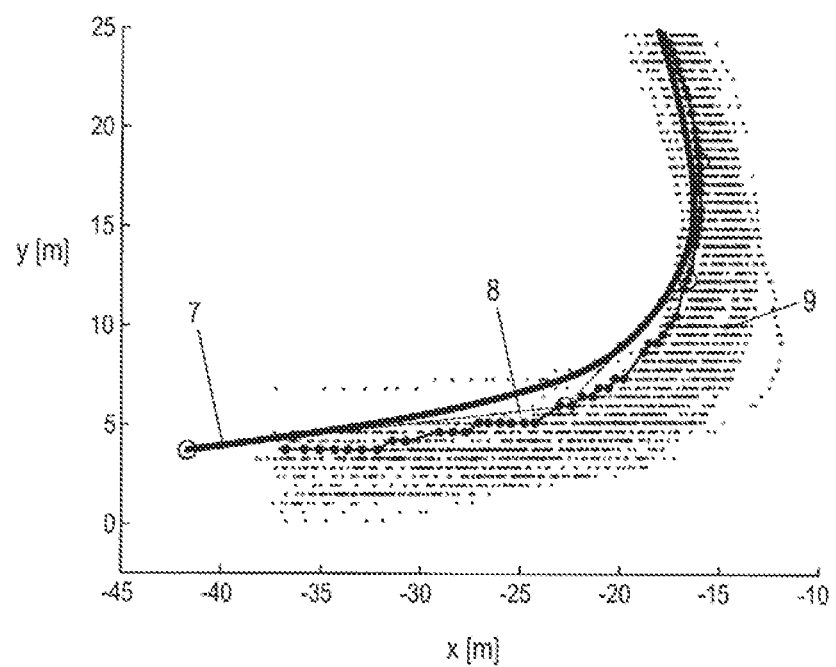
FIG. 2 schematically shows the process of determining an initial compensation curve according to one exemplary embodiment.

FIG. 2 shows, in an enlarged manner, a section from FIG. 1 which can be determined on the basis of the x and y indications. FIG. 2 schematically shows the process of determining an initial compensation curve according to one exemplary embodiment, for which purpose the number of checkpoints is first of all determined. These two steps are based on a selected route 8. This route may be randomly selected, possibly with the restriction that it contains plausible position indications, that is to say position indications which do not represent an excessive zig-zag course or have other properties which indicate a highly noisy measurement. Reference numeral 9 is used to denote those position indications which are within the section considered in FIG. 2.

The length $l_{ig}$ of this selected route is then determined. This length $l_{ig}$ is then divided by the divisor length $k_{igl}$ and is rounded down to the largest integer in order to determine the number of checkpoints L:

$$L = \text{floor}\left(\frac{l_{ig}}{k_{igl}}\right)$$

Of the position indications of the selected route, those for which a vehicle speed above a threshold value of 3 km/h, for example, has also been recorded are selected. The set of selected position indications is denoted using $M_{ig}$. It is assumed here that, for the position indications, the vehicle speed was always also recorded at the location of the position indication. This selection ensures that the position indications do not lie above one another.

Finally, an initial B-spline third-order compensation curve $P_{ig}(t)$ is created. For this purpose, L checkpoints Bi are first of all created. The values of the checkpoints Bi are taken from the values of a curve resulting from standard evaluation, for example interpolation, between the position indications $M_{ig}$. In this case, the values are taken at the distance $k_{igl}$ on the curve. An end point and an origin point (one of them is indicated in FIG. 2 with a circle at approximately x=−42.5 m and y=4.5 m) are additionally added at the two ends of the curve as an additional checkpoint somewhat before the selected route, with the result that it projects from the measurement data. The origin point may be obtained by extrapolating the selected route. The B-spline compensation curve is determined according to the recursion stated in "A Practical Guide to Splines", Applied Mathematical Sciences, Springer, 2001 by C. De Boor, which is reproduced here in shortened form but in a manner enabling a person skilled in the art to execute it:

$$P(t) = \sum_{i=1}^{L} P_i B_i^p(t)$$

where:
u is a uniformly distributed node vector with m=L+1 elements $$u_0 = 0, u_m = 1, u_{i+1} - u_i = \frac{1}{L}$$

$$B_i^0(t) = \begin{cases} 1, \text{ if } u_i \le t \le u_{i+1} \\ 0, \text{ else} \end{cases}$$

$$B_i^p(t) = \frac{t - u_i}{u_{i+p} - u_i} B_i^{p-1}(t) + \frac{u_{i+p+a} - t}{u_{i+p+1} - u_{i+1}} B_{i+1}^{p-1}(t)$$

In this manner, the final P(t) is calculated recursively, in which case the compensation function for p=3 is calculated here. t is the control variable which is proportional to the length along the curve and L is the number of checkpoints, as already defined above. Reference numeral 7 is used to denote the initial compensation curve determined.

As is clear in FIG. 2, the position indications are handled here as individual points which are not listed in the order of passing through and are also not assigned to routes. They are substantially an unorganized point cloud. This entails the advantage that the position indications can be efficiently stored for subsequent processing.

Figure 3:
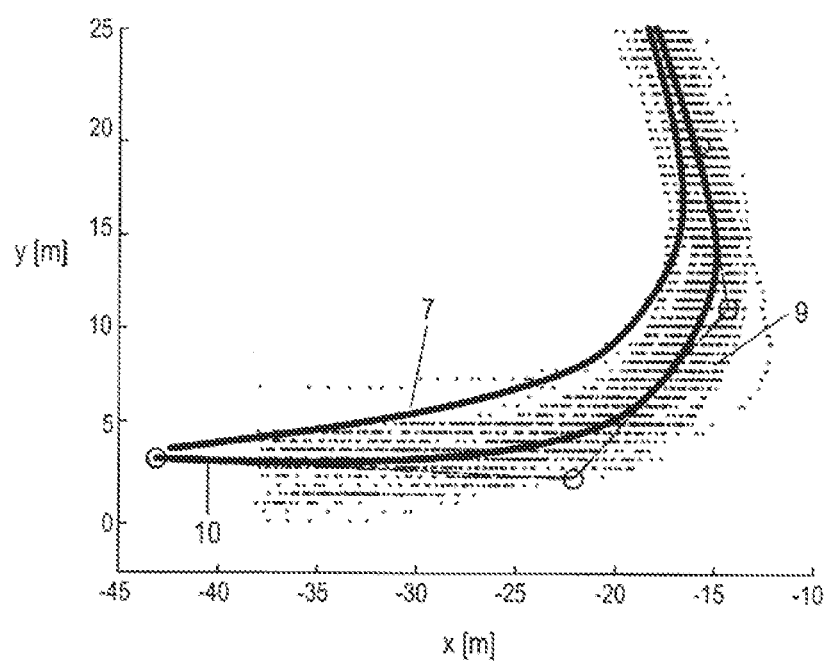
FIG. 3 schematically shows the process of determining the compensation curve which is output as the lane course according to one exemplary embodiment.

The compensation curve 9 is optimized as the next step. In this respect, FIG. 3 illustrates the result 10 of the compensation curve 10 which is newly determined for the third time and is also output as the lane course.

The following steps are carried out for each recalculation.

A base point $P(t_k)$ on the previously determined compensation curve (possibly the initial compensation curve) is first of all determined for each position determination $M_k$. For this purpose, that $t_k$ which minimizes the magnitude of the distance between $M_k$ and $P(t)$ (for all t), that is to say $\|P(t_k)-M_k\|=\min$, for all t, is sought. A $t_k$ is determined for each $M_k$. The magnitude of the distance is ideally equal to zero.

Therefore, the following ideally applies to each $M_k$:

$$P_1 B_1(t_k) + \ldots + P_n B_n(t_k) - M_k = 0$$

where n=L.

The compensation curve is newly determined or optimized to the effect that new checkpoints $P_i$ are intended to be found. On the basis of the equation set up above, the following matrix equation system can therefore be set up, from which the checkpoints $P_i$ are intended to be found:

$$\underbrace{\begin{bmatrix} B_1(t_1) & \ldots & B_n(t_1) \\ & \vdots & \\ B_1(t_m) & \ldots & B_n(t_m) \end{bmatrix}}_{B} \underbrace{\begin{bmatrix} P_1 \\ \vdots \\ P_n \end{bmatrix}}_{P} = \underbrace{\begin{bmatrix} M_1 \\ \vdots \\ M_m \end{bmatrix}}_{M}$$

where m indicates the total number of position indications here. This linear equation system is overdetermined for a sufficiently large number of position indications. Since a lane course is intended to be determined by means of the present method by combining a large number of noisy position determinations, a sufficiently large number of position determinations will typically be present. If not, the multiplicity of lane courses should be increased by further lane courses.

On account of the overdetermined nature and the independent columns of matrix B, $B^T B$ can always be inverted. The above equation system can therefore be solved according to P:

$$P = (B^T B)^{-1} B^T M$$

Determining the optimized checkpoints P with the aid of a linear equation system therefore advantageously makes it possible to use computationally efficient solution algorithms. The new checkpoints P found in this manner define the newly determined B-spline compensation curve.

The respective newly determined compensation curves converge quickly and, in the present exemplary embodiment, the process is terminated after the compensation curve P has been newly determined three times. The compensation curve determined last is output as the lane course.

Figure 4:
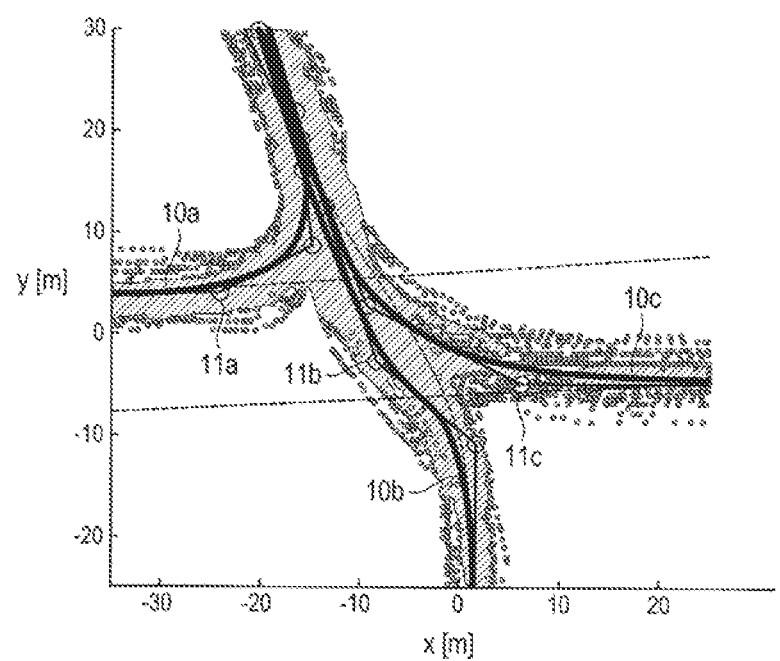
FIG. 4 schematically shows the results of determining lane courses for an intersection according to one exemplary embodiment.

FIG. 4 schematically shows the results of determining lane courses 10a to 10c for an intersection according to one exemplary embodiment. This example relates to the intersection situation already presented in FIG. 1. FIG. 4 shows the determination of the lane courses only from "above", in which case the intersection access road has a single lane in reality from above. This also becomes clear from the fact that the lane courses 10a to 10c overlap in the intersection access road.

Furthermore, journeys through the intersection which are recorded using a highly accurate GPS system are depicted using the reference symbols 11a to 11c. There is generally a good correspondence between the curves. When travelling straight ahead, there are greater discrepancies on account of the specific selected route for the passage of the vehicle with the highly accurate GPS system.

Figure 5:
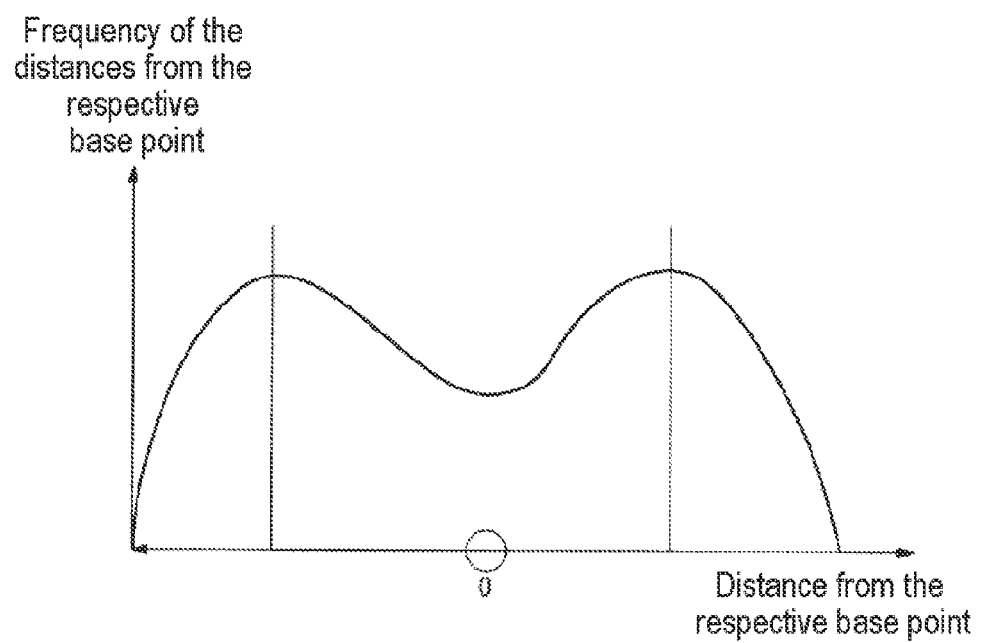
FIG. 5 schematically shows an exemplary frequency distribution of distances between position indications and base points for the case of two parallel lanes.

If a road comprises two or more parallel lanes for the same possible maneuver, the position indications of the vehicles will have accumulations in the center of each lane. These accumulations can be used to distinguish the routes running on parallel lanes. The determination of the compensation curve can be followed by an investigation following the presented method in order to discover parallel lanes for the same possible maneuver. For this purpose, the distances between the position determinations and their base points which are then to be newly determined are determined at least for certain sections (for example the access road section of the intersection) and are represented as a frequency distribution on the basis of the distance from the compensation curve. If two or more maxima are shown in this step at a typical distance from lane centers, parallel lanes for the same possible maneuver can be inferred. The compensation curve determined can then be replaced with compensation curves for each lane, which compensation curves are each adapted with respect to the common compensation curve, for example by means of a vertical shift at certain points by half of a typical lane width in comparison with the common compensation curve. FIG. 5 schematically shows an exemplary frequency distribution of distances from base points. The frequency distributions are grouped into distance ranges; the illustration in FIG. 5 is smoothed. The circle on the distance axis is used to denote the compensation curve which was determined last and the two vertical lines are used to denote the maxima of the frequency distributions which are separated here by the typical distance between the centers of two parallel lanes. The existence of two parallel lanes for the same driving maneuver can be inferred from the evaluation of the frequency distribution shown in FIG. 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an advance driver assistance system, the method comprising:
    receiving a plurality of recorded routes of vehicles, each of the plurality of recorded routes including individual position indications in an order of passing during a respective journey;
    determining a lane course based on a B-spline compensation curve, wherein determining the lane course includes a processor performing the following acts:
    selecting a route from the plurality of recorded routes;
    determining, based on the selected route, a number of checkpoints to be used in generating the B-spline compensation curve, and a value of each checkpoint;
    generating a first B-spline compensation curve based on the number of checkpoints and the value of each checkpoint;
    generating a second B-spline compensation curve based on the first B-spline compensation curve and individual position indications of the plurality of routes, wherein determining the second B-spline compensation curve is independent of an order of position indications in one of the respective routes and is independent of the fact that a position indication used is assigned to a route from the plurality of routes;

assigning the second B-spline curve as the first B-spline curve and repeating the act of generating the second B-spline compensation curve until an abort condition is satisfied;

and when the abort condition is satisfied, assigning the second B-spline compensation curve as the lane course; and displaying a warning to a driver of the vehicle when it is determined by advance driver assistance system, based on the lane course, that a collision is likely.

2. The method as claimed in claim 1, further comprising the following acts which are carried out before all other acts:

determining those routes from the plurality of routes which at least one of follow the same lane and represent the same driving maneuver; and including only the determined routes in the plurality of routes.

3. The method as claimed in claim 2, wherein determining those routes from the plurality of routes further comprising determining, for each such route, whether each such route has position indications in a first predefined position region and in a second predefined position region.

4. The method as claimed in claim 1, wherein determining the number of checkpoints comprises: dividing a length of a randomly selected route by a predefined divisor length; and selecting the number of checkpoints on the basis of a result of said dividing.

5. The method as claimed in claim 1, wherein determining the second B-spline compensation curve comprises, for each individual position indication used:

determining a point on the first B-spline compensation curve which is at the shortest distance from the respective individual position indication;

determining said point as a base point for the respective individual position indication.

6. The method as claimed in claim 2, wherein determining the new compensation curve comprises, for each individual position indications used:

determining a point on the first B-spline compensation curve which is at the shortest distance from the respective individual position indication;

determining said point as a base point for the respective individual position indication.

7. The method as claimed in claim 3, wherein determining the new compensation curve comprises, for each individual position indications used:

determining a point on the first B-spline compensation curve which is at the shortest distance from the respective individual position indication;

determining said point as a base point for the respective individual position indication.

8. The method as claimed in claim 1, wherein determining the second B-spline compensation curve comprises performing a multiplication of matrices, wherein at least one matrix of said matrices comprises the individual position indications used in said determining of the second B-spline compensation curve.

9. The method as claimed in claim 1, wherein the position indications are determined with the aid of a satellite navigation system.

10. The method as claimed in claim 1, wherein the method comprises the following acts which are performed after a final determination of the second B-spline compensation curve:

for a section of the second B-spline compensation curve where the section comprises the entire second B-spline compensation curve, for the position indications used in the section of the second B-spline compensation curve:

determining a respective shortest distance between the individual position indication and the second B-spline compensation curve;

determining a frequency distribution on the basis of the respective shortest distance;

determining whether the frequency distribution indicates that there are at least two parallel lanes based on at least two detected maxima of the frequency distribution; and deriving a number of lane courses corresponding to a number of the at least two detected maxima from the second B-spline compensation curve of the final determination.

11. An apparatus for avoiding collisions involving a vehicle, the apparatus comprising:

a memory configured to store individual position indications and parameters of B-spline compensation curves, and a processor configured to:

receive a plurality of recorded routes of vehicles, each of the plurality of recorded routes including individual position indications in an order of passing during a respective journey;

select a route from the plurality of recorded routes, determine a number of checkpoints for a B-spline compensation curve, and a value for each checkpoint, based on the selected route, generate an initial B-spline compensation curve based on the number of checkpoints and the value of each checkpoint, repeat the following acts until an abort criterion has been satisfied:

generate a new B-spline compensation curve based on a previously-determined B-spline compensation curve and individual position indications of the plurality of routes, wherein determining the new B-spline compensation curve is independent of an order of position indications in one of the respective routes and is independent of the fact that a position indication used is assigned to a route from the plurality of routes, and when the abort condition is satisfied, assigning the new B-spline compensation curve as the lane course;

determine that a collision with the vehicle is likely based on the lane course; and display a warning to a driver of the vehicle when it is determined that a collision is likely.

12. A non-transitory computer readable medium having processor executable code embodied therein, which when executed by a processor causes the processor to perform the method of claim 1.

* * * * *